United States Patent
Paila et al.

(10) Patent No.: US 7,551,683 B2
(45) Date of Patent: Jun. 23, 2009

(54) ADJUSTING DATA BURST TRANSMISSION RATES

(75) Inventors: Toni Paila, Degerby (FI); Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 603 days.

(21) Appl. No.: 10/561,987

(22) PCT Filed: Jun. 29, 2004

(86) PCT No.: PCT/IB2004/051048

§ 371 (c)(1), (2), (4) Date: Mar. 31, 2006

(87) PCT Pub. No.: WO2005/002086

PCT Pub. Date: Jan. 6, 2005

(65) Prior Publication Data

US 2006/0211436 A1     Sep. 21, 2006

(30) Foreign Application Priority Data

Jun. 30, 2003     (GB) ................................. 0315265.9

(51) Int. Cl.
*H04K 1/02*     (2006.01)
(52) U.S. Cl. ...................................... 375/295
(58) Field of Classification Search ............... 375/296, 375/354, 356; 455/502, 503
See application file for complete search history.

(56) References Cited

U.S. PATENT DOCUMENTS 5,822,701 A * 10/1998 Tomisato et al. ............ 455/502

(Continued)

FOREIGN PATENT DOCUMENTS

EP     1 404 144 A1     3/2004

(Continued)

OTHER PUBLICATIONS

PCT International Search Report (as published), International Application No. PCT/IB2004/051048, Date of Completion of Search—Nov. 11, 2004.

*Primary Examiner*—Kevin Y Kim
(74) *Attorney, Agent, or Firm*—Locke Lord Bissell & Liddell LLP (57)     ABSTRACT

A broadcast service for transmission to mobile terminals 10a-10c in a cellular communication system comprises a series of burst B1-B5 of data packets in a transport stream 7. Where the available data transmission rates in cells C1, C2 are unequal, the transport stream 7a for transmission to the cell C1 with the higher data transmission rate is modified by incorporating additional payload L1-L5 in each burst in the series, for example by appending the additional payload to each burst or by interleaving the burst data and additional payload (FIG. 7) so that a time interval t; between adjacent bursts B1-B5 is the same in both cells C1, C2. Therefore, start times of the transmission of each burst B1-B5 in both cells C1, C2 are synchronised, i.e. the transmission of each burst B1-B5 begins simultaneously in both cells C1 or a time interval to between the start of transmission of each burst in cells C1, C2 is fixed (FIG. 5). This allows a mobile terminal 10b operating in a selective data reception mode to continue receiving a service without disruption when moving across a cell boundary 11. The incorporation of the additional payload may be performed by a digital broadcast head-end 26 or by an apparatus 13 associated with a transmitter 8 serving a cell C1.

33 Claims, 7 Drawing Sheets

U.S. PATENT DOCUMENTS

| | | |
|---|---|---|
| 6,072,847 A | 6/2000 | Dupuy et al. |
| 2004/0120285 A1 | 6/2004 | Paila et al. |

FOREIGN PATENT DOCUMENTS

| | | |
|---|---|---|
| WO | WO 99/17470 | 4/1999 |
| WO | WO 01/15345 A1 | 3/2001 |
| WO | WO 2004/023695 A2 | 3/2004 |

* cited by examiner

ADJUSTING DATA BURST TRANSMISSION RATES

FIELD OF THE INVENTION

The invention relates to the transmission of data in a broadcast data service. The invention is particularly suitable for, but not limited to, broadcasting data to mobile terminals.

BACKGROUND OF THE INVENTION

The provision of a broadcast service may require the transmission of one or more to of video, audio and other data signals. For example, a service may include a first stream carrying primary content, such as live or recorded music or a multimedia clip, and further streams carrying secondary content, such as error correction data, subtitles or song lyrics. Such services can be broadcast in a multiplexed transport stream using digital broadcasting networks, e.g. terrestrial Digital Video Broadcast (DVB-T), Integrated Services Digital Broadcasting (ISDB-T) or Advanced Television Systems Committee (ATSC-T), DVB-S (satellite), DVB-C (cable) or digital audio broadcasting (DAB) systems.

Wireless communication systems typically include one or more mobile terminals having stringent power requirements. Such a terminal may be required to operate for lengthy periods of time using only an internal source of power. In the case of simplex broadcast systems supporting unidirectional data delivery, e.g. DVB-T or DVB-S networks, a large proportion of the power consumption of the terminal arises from the demands of a receiver when receiving data. It is desirable to conserve power by reducing the amount of data received, i.e. by selectively receiving only data relating to service or content requested by the user.

Selective data reception for receiving a particular stream of data in a Time Division Multiple Access (TDMA) transmission can be implemented by switching the receiver between its on and off states, so that data reception is suspended during time slots relating to services or content that are not required. For example, in our co-pending application, GB0216240.2, a method is disclosed in which information conveyed in an IP service announcement is used to control the operation of a receiver in order to selectively receive a particular number of broadcast or multicast messages relating to that service. In another co-pending application, PCT/IB02/04823, a receiver is controlled so that data is selectively received according to a schedule of delivery time slots. The schedule is extracted from information relating to the content source as conveyed in a session announcement. When data reception is not required, i.e. when data relating to the selected service is not being transmitted, the receiver is disabled or switched into a low power operating mode in order to conserve power.

The performance of these methods may be improved by grouping related data packets into bursts before their transmission. The transmission takes the form of a sequence of bursts taking up most or all of the available bandwidth for a relatively short period of time. In this manner, each burst carries a significant amount of interrelated data. This further reduces the period of time for which the receiver is actively receiving data.

Figure 1:
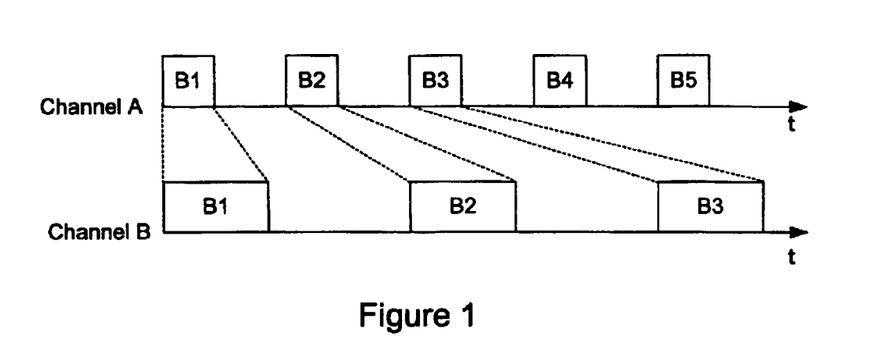
FIG. 1 depicts the transmission of a series of bursts over two channels with different rates.

However, where data is broadcast to one or more mobile terminals in a cellular communication system, the same series of bursts may be transmitted to terminals located in first and second cells at different rates. FIG. 1 shows a series of bursts B1-B5 transmitted over two channels A, B. While each burst contains the same number P of data packets, the burst transmission rate of channel A exceeds that of channel B. Differences in the burst transmission rates may occur where, for example, the bit rate of channel A is greater than that of channel B or where the bit rate in one or both channels is shared between burst data and other data during the transmission of the bursts B1-B5, which results in the burst series being transmitted at different effective bit rates in channel A and channel B.

In FIG. 1, the duration of a burst B1 transmitted on channel B is longer than the duration of the corresponding burst on channel A. As the length of time required for the transmission of data on channel B is longer than that of an equivalent transmission on channel A, the interval between bursts B1, B2 in the series transmitted on channel B exceeds the interval between bursts transmitted on channel A. Therefore, the delay in the transmission of each burst in the series on channel B, when compared with channel A, increases over time. Problems may arise when a terminal moves from a location covered by a first cell, within which channel A is received, to another covered by a second cell, where the terminal receives the same data over channel B, as the increasing time offset between transmission of the corresponding bursts over channels A, B will disrupt selective reception of content or services in that terminal.

SUMMARY OF THE INVENTION

According to a first aspect of the invention, a method of broadcasting data in a cellular communication system including first and second cells comprises receiving data from a source, producing a first data stream comprising said data in the form of a series of bursts, producing a second data stream comprising the series of bursts such that, when the first and second data streams are broadcast in the first and second cells respectively, start times of bursts in the second cell are synchronised with start times of corresponding bursts in the first cell, broadcasting the first data stream in the first cell and broadcasting the second data stream in the second cell.

The start times of bursts in the first and second cells are synchronised so that time intervals between adjacent bursts in the series are the same in both cells. The bursts may be synchronised so that their start times are simultaneous or so that there is a fixed time offset between a start time of a burst in the first cell and the start time of an equivalent burst in the second cell. By synchronising the bursts in this manner, the method may allow a terminal moving between the first and second cells to continue selective reception of the burst series with little or no disruption.

The second data stream may be configured in accordance with first and second data transmission rates associated with the first and second cells respectively. For example, the transmission rate of each cell may be divided between sets of data, or services, from a number of sources. The transmission rate allocated to a particular service may vary from cell to cell, so that the same service is transmitted at different rates in two or more cells. The allocated transmission rate for the service within a cell is the available transmission rate for the service and is equal to or lower than the transmission rate of that cell. If the available transmission rate is higher than the transmission rate required by the service, additional data may be added to the burst transmitted in that cell. In particular, where the available transmission rates in the first and second cells differ from each other, additional data may be added to the burst transmitted in the cell having the higher available transmission rate. The amount of additional data incorporated in the second data stream may be based on the transmission rates available in the cells. An additional data limit may be determined on the basis of the first and second data transmission rates such that, when an amount of additional data equal to said additional data limit is added to each burst in the series in the second data stream prior to broadcast, the start times of corresponding bursts in the first and second cells are synchronised. If the additional data limit is greater than zero, that is, if the second cell has an available data transmission rate exceeding that of the first cell, an amount of additional data that is less than or equal to said additional limit is added to each burst in the second data stream. If the amount of additional data is equal to the additional data limit, the bursts in the first and second data streams will be synchronised. If the amount is less than this limit, it is still possible to synchronise the bursts by maintaining intervals between bursts broadcast in the second cell that are equal to those between corresponding bursts broadcast in the first cell.

The method allows bursts of additional data to be multiplexed with the series of bursts and broadcast in the cell having a higher available transmission rate. The additional data may be interleaved with the data in each burst in the series, potentially allowing the burst length perceived by a receiving device to be the same in both the first and second cells. Alternatively, a burst of additional data may be added to the data stream at the end of each burst. Where a receiving device selectively receives the bursts, this feature potentially reduces the length of time that a receiver is in receiving mode, as the receiver may be switched into a low power mode or into an off state so that the additional data bursts are not received, thereby reducing its power consumption. Optionally, the start times of additional data bursts may be synchronised with the start times of bursts carrying the additional data in a third cell.

The additional data may be local data associated with the first cell, other data, padding or a combination of some or all of these.

According to a second aspect of the invention, a method of broadcasting data in a cellular communication system including first and second cells comprises receiving a series of data bursts from a source, outputting a first data stream comprising the series of data bursts such that when the first data stream is broadcast in the first cell and a second data stream comprising the series of bursts is broadcast in a second cell, start times of bursts in the first cell are synchronised with start times of corresponding bursts in the second cell and broadcasting the first data stream in the first cell.

The first data stream may be configured in accordance with first and second data transmission rates associated with the first and second cells respectively. The step of outputting a first data stream preferably comprises determining an additional data limit on the basis of first and second data transmission rates associated with the first and second cells respectively such that, when an amount of additional data equal to said additional data limit is added to each burst in the series in the first data stream prior to broadcast, the start times of bursts broadcast in the first cell are synchronised with the start times of corresponding bursts in the second data stream when broadcast in the second cell and, if the additional data limit is greater than zero, receiving additional data from an additional data source and multiplexing an amount of additional data less than or equal to said additional data limit with each data burst in the first data stream, said amount being less than or equal to said additional data limit.

According to a third aspect of the invention, a method of broadcasting data in a cellular communication system including first and second cells comprises receiving data from a source, producing a first data stream comprising said data in the form of a first series of bursts, determining an additional data limit based on data transmission rates associated with the first and second cells such that, when an amount of additional data equal to said additional data limit is added to each burst in the series in a second data stream, first time intervals between bursts in the first data stream when broadcast in the first cell are equal to second time intervals between corresponding bursts in the second data stream when broadcast in the second cell, if said additional data limit is less than or equal to zero, producing a second data stream comprising the series of bursts, if said additional data limit is greater than zero, producing a second data stream comprising a series of modified bursts, wherein each burst comprises said data and an amount of additional data that is less than or equal to the additional data limit.

According to a fourth aspect of the invention, an apparatus for use in a cellular communication system including first and second cells comprises receiving means operable to receive data from a source, means for producing a first data stream for transmission in the first cell, the first data stream comprising said data in the form of a series of bursts, means for producing a second data stream for transmission in the second cell, wherein the second data stream comprising the series of bursts and is configured so that, when the first and second data streams are broadcast in the first and second cells respectively, start times of bursts in the second data stream are synchronised with start times of corresponding bursts in the first data stream.

Preferably, the apparatus is operable so that the second data stream is configured in accordance with first and second data transmission rates associated with the first and second cells respectively.

This aspect further provides a communication system comprising such an apparatus together with a network and one or more receiving devices. The network may be, for example, a DVB network.

According to a fifth aspect of the invention, an apparatus for use in a cellular communication system including first and second cells comprises receiving means operable to receive a data stream from a source, said data stream comprising a series of data bursts, means for determining an additional data limit on the basis of first and second data transmission rates associated with the first and second cells such that, when said an amount of additional data equal to said additional data limit is added to each burst in the series in the first data stream, start times of bursts in said data stream when broadcast in the first cell are synchronised with start times of corresponding bursts in a second data stream broadcast in the second cell, and means for multiplexing the series of data bursts with bursts of additional data to produce a modified data stream in the event that the additional data limit amount is greater than zero, wherein each burst of additional data comprises an amount of additional data that is less than or equal to said additional data limit.

This aspect further provides a communication system comprising such an apparatus together with a network and one or more receiving devices. The network may be, for example, a DVB network.

BRIEF DESCRIPTION OF THE DRAWINGS

Embodiments of the invention will now be described with reference to the accompanying drawings, in which.

DETAILED DESCRIPTION

Figure 2:
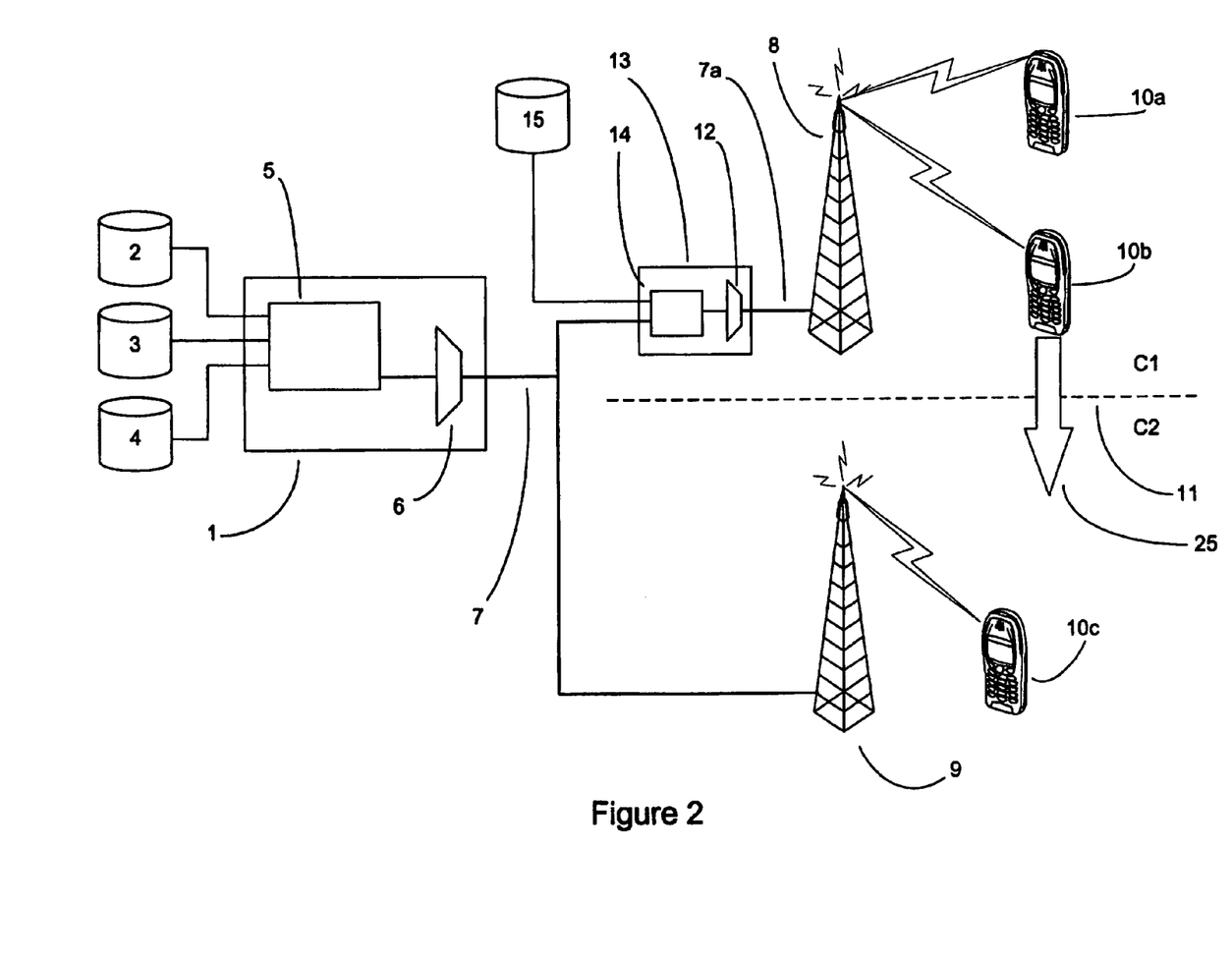
FIG. 2 depicts a communication system according to a first embodiment of the invention.

FIG. 2 shows a communication system according to a first embodiment of the invention, in which a broadband digital broadcast head-end 1 is connected to a variety of content sources 2, 3, 4. Data packets relating to services and/or content, e.g. audio-visual content, data files, images, are delivered to the head-end 1. In this example, the data packets are in the form of IPv4 or IPv6 datagrams, although the invention is not limited to IP data delivery.

The data packets are encapsulated by a data processor 5 at the head-end 1 and grouped together into one or more bursts, which have a bandwidth equal to or approaching the maximum available bandwidth. A set of data packets relating to a particular service or the same content are arranged in the same burst or series of bursts, although a single burst may contain a plurality of sets of data packets that are unrelated to each other to ensure efficient use of bandwidth. The bursts are multiplexed by a multiplexer 6 according to a TDMA scheme. In this example, the bursts are transmitted in a MPEG-2 transport stream 7 to network transmitters 8, 9 for broadcast to terminals 10a, 10b, 10c over a communication network, such as a DVB network. Each terminal 10a, 10b, 10c is under the control of a user who is able to select a particular service or content from those transmitted in the transport stream 7.

It should be noted that simplified data transmission paths, comprising only a network transmitter 8 or 9 are depicted in the figures. However, in practice, the transmission paths may include further stages, such as uplink transmitters and satellite links and/or intermediate network transmitters etc. In the case of a satellite network, the data in the transport stream 7 may be broadcast to terminals 10 falling under the satellite footprint. In a terrestrial system, the terminals 10 fall within areas of coverage C1, C2, each associated with a network transmitter 8, 9 and divided by a cell boundary 11.

The transmitters 8, 9 broadcast the bursts to terminals 10a, 10b, 10c within cells C1, C2 with burst transmission rates of br(1) and br(2) respectively. In this example, br(1) is higher than br(2). Differences in the burst transmission rates may arise from the transmitters 8, 9 transmitting data at different bit rates, or sharing of the bit rate in one or both cells C1, C2 between the series of the bursts and other data in one or both cells C1, C2, so that the bursts are transmitted at different effective bits rates in cells C1 and C2. For example, in a communication system where one or more second head-ends operate alongside the first head-end 1, each outputting a further transport stream that is multiplexed with the transport stream 7, e.g. at a second multiplexer 12, the transmission capacity in a cell C1 may be divided between the streams produced by these head-ends. In such an arrangement, the burst transmission rates br(1) is not the bit rate associated with the transmitter 8, but the rate at which data from the first head-end 1 is transmitted in the cell C1. The burst transmission rate will be less than or equal to the bit rates for the relevant cell C1.

In order to maintain synchronised start times for transmission of each burst in a series, the burst transmission rate in cell C1 is adjusted to match that of cell C2 as follows. Means 13 for adjusting burst transmission rate is associated with the first transmitter 8, comprising a second data processor 14 and second multiplexer 12. The second data processor 14 receives the transport stream 7. If it is necessary to reduce the burst transmission rate to maintain synchronisation with the broadcast burst series in cell C2, the second data processor 14 imports additional data from a data source 15. Any such additional data is combined with the data in the transport stream 7 by the second multiplexer 12 to produce a modified transport stream 7a for broadcast by transmitter 8. In this example, transmitter 9 broadcasts the unmodified transport stream 7. However, a second means for adjusting burst transmission may be associated with the second transmitter 9 if required, to adjust the burst transmission rate in cell C2 to match that of further neighbouring cells.

Figure 3:
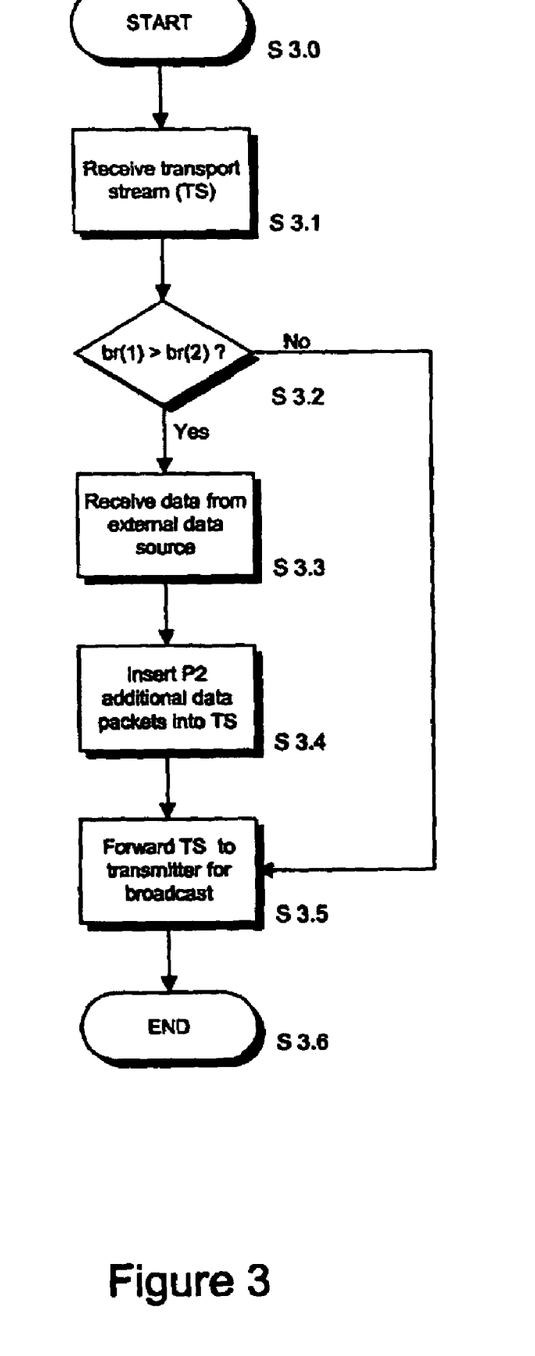
FIG. 3 is a flowchart of a burst transmission rate adjustment process according to the first embodiment of the invention.

The burst transmission rate adjustment process will now be described in detail. Referring to FIG. 3 and starting at step s3.0, the second data processor 14 receives data from the transport stream 7 (step s3.1). The second data processor 14 then determines whether to adjust the burst transmission rate by comparing the burst transmission rates in cell C1 and its neighbouring cell C2 (step s3.2). As br(1)>br(2), in this example, it is necessary to reduce the burst transmission rate in cell C1 in order to synchronise start times of the bursts in cells C1 and C2.

Figure 4:
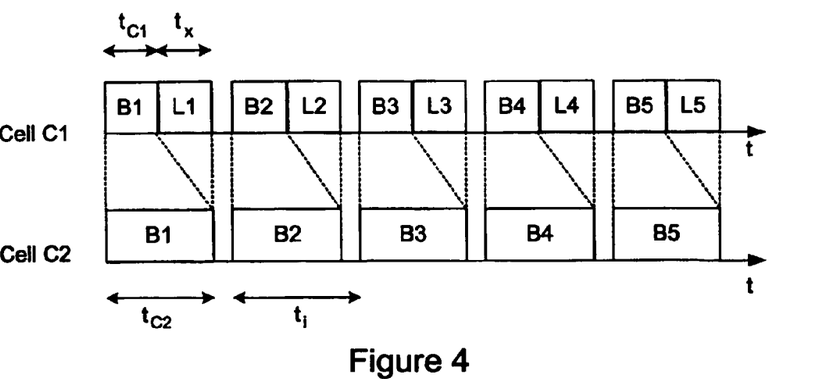
FIG. 4 shows the transmission of a series of bursts in two communication cells following adjustment of the burst transmission rate according to the first embodiment of the invention.

FIG. 4 depicts the broadcast of a series of bursts B1-B5 to terminals in cells C1, C2 according to the first embodiment of the invention, where each burst B1-B5 contains P bytes of data. The duration of a burst transmission in cell C1, $t_{C1}$, is less than that of the corresponding burst in cell C2, $t_{C2}$. In order to avoid the scenario of FIG. 1, in which a substantial and increasing time offset develops between the transmission of bursts B2-B5 in cells C1, C2, additional data L1-L5 is incorporated in the bursts B1-B5 in cell C1. The additional data L1-L5 may be, for example, an advertisement, local data associated with the first cell, other data, padding to be discarded by the terminal 10 or a combination of some or all of these. The payload P2 of the additional data is selected so that:

$$P2 = br(1) \cdot (t_{C2} - t_{C1}),$$

i.e.

$$t_{C2} = t_{C1} + t_X,$$

where $t_X$ is the transmission time of the additional data. Therefore, in this example, time slots of equal length are associated with each burst B1-B5 in both cells C1, C2 and the start times of each burst broadcast in cells C1, C2 are synchronised.

Where it is necessary to reduce the burst transmission rate, i.e. where P2 is greater than zero, the second data processor 14 imports additional data from a data source 15 (step s3.3). The appropriate payload P2 of additional data is combined with the data in the transport stream 7 by the second multiplexer 12, producing a modified transport stream 7a (step s3.4). The modified transport stream 7a is forwarded for broadcast by transmitter 8 (step s3.5), completing the adjustment process for that data (step s3.6).

In this example, where br(1) exceeds br(2), transmitters 8 and 9 broadcast the modified transport stream 7a and unmodified transport stream 7 respectively. However, if br(1) is less than, or equal to, br(2), then no adjustment of the burst transmission rate is required in cell C1, as indicated by a value of P2 that is less than, or equal to, zero. In such cases, the unmodified transport stream 7 is forwarded to the transmitter 8 (step s3.5).

Figure 5:
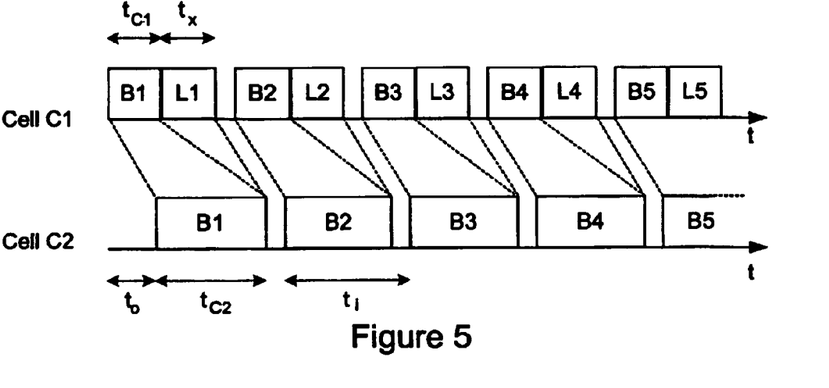
FIG. 5 shows the transmission of a series of bursts in two communication cells following adjustment of the burst transmission rate according to a second embodiment of the invention.

The burst rate adjustment process of FIG. 3 synchronises the data bursts so that a time interval $t_i$ between adjacent bursts B1-B5 in the series is the same in both cells C1, C2. The data bursts may be synchronised so that the transmission of each burst B1-B5 in the series begins in cells C1, C2 simultaneously, as shown in FIG. 4. Alternatively, according to a second embodiment of the invention, the start times may be synchronised so that there is a fixed time offset $t_o$ between a start time in cell C1 and a start time in cell C2 for each burst B1-B5 in the series, as shown in FIG. 5.

The synchronisation of the data bursts between cells C1, C2 minimises disruption of data reception when a terminal 10b moves from a location covered by the first cell C1 to another covered by the second cell C2 or vice versa. An example of a suitable terminal, here a mobile telecommunications device 10b, is shown in detail in FIG. 6 and comprises an internal power supply, preferably in the form of a rechargeable battery 16, a controller 17, a user interface 18, a receiver 19, a transceiver 20, codecs 21, 22, a memory 23 and a data storage facility 24. The receiver 19 is configured to receive data from the communication network, while the transceiver 20 enables mobile telephone communications via a separate cellular telecommunications network.

Figure 6:
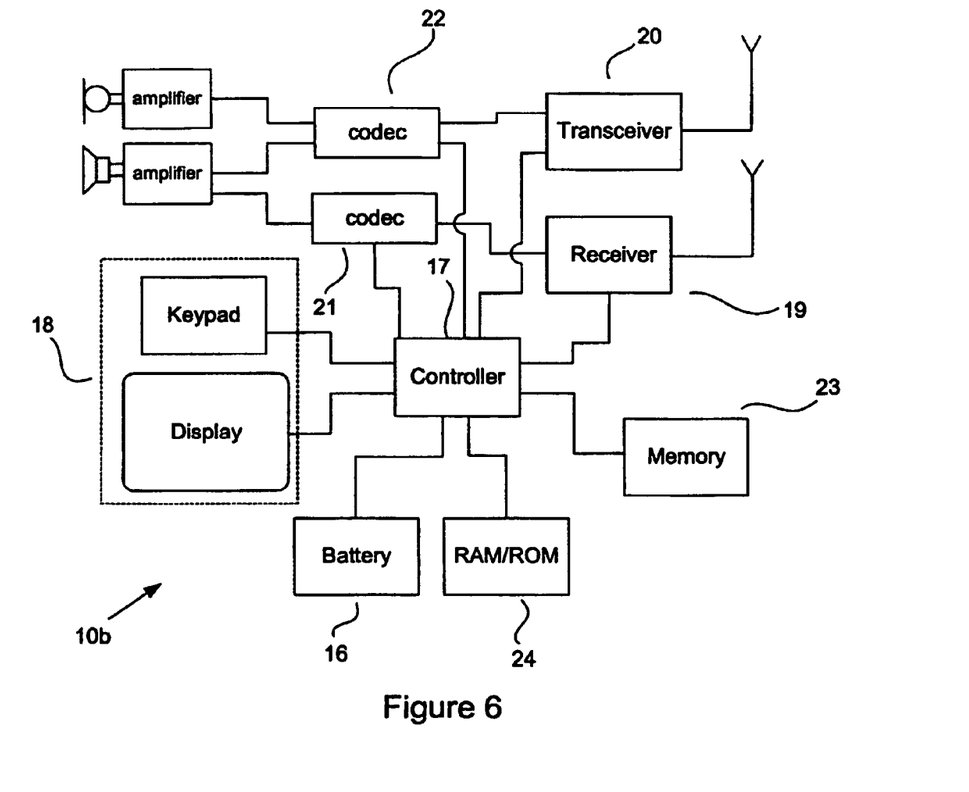
FIG. 6 is a block diagram of a terminal for use in the communication system of FIG. 2.

The receiver 19 has a relatively large power requirement when compared with other components of the terminal 10b. In order to minimise drain on the battery 16, the receiver 19 can be switched on and off in response to instructions received from the controller 17 in order to selectively receive data bursts relating to content or services requested by the user.

Where, for example, a user of terminal 10b is accessing content or services, the content or service is selectively received as the controller 17 calculates the expected start time of the transmission of the next relevant data burst in the modified transport stream 7a on the basis of burst interval $t_i$, which may be known in advance or communicated to the terminal. The controller 17 then switches the receiver 19 on at the calculated start time for the duration of the burst length. When the terminal is moved across the cell boundary 11 between cell C1 to cell C2, as indicated by arrow 25 in FIG. 2, the burst interval $t_i$ and, optionally, the start time of subsequent bursts, remain the same, so that the terminal 10b can continue receiving the content or service with little or no disruption, using the unmodified transport stream 7.

The terminals 10a, 10b may be configured so that, if the additional data L1-L5 is not of interest to a user, the controller 17 switches the receiver 19 off at the end of each burst B1-B5, during the time slot associated with the bursts B1-B5, so that the additional data bursts L1-L5 are not received. In this arrangement the controller 17 uses the known burst transmission rates br(1), br(2) to calculate the time at which the reception of each burst B1-B5 is completed and switches the receiver 19 off accordingly. Alternatively, the controller 17 may switch the receiver 19 off on reception of a marker data packet indicating the end of a burst B1-B5. This mode of operation is preferable to a mode in which the additional data L1-L5 is received and then discarded, as it further reduces the power consumption of the receiver 19.

Figure 7:
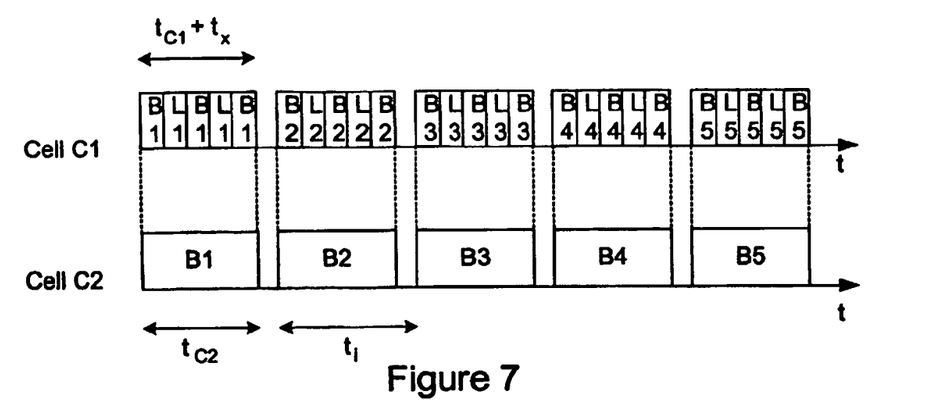
FIG. 7 shows the transmission of a series of bursts in two communication cells following adjustment of the burst transmission rate according to a third embodiment of the invention.

FIG. 7 depicts the broadcast of series of bursts B1-B5 according to a third embodiment of the invention. In this embodiment, the payload P2 is calculated as described above however, instead of adding the additional data L1-L5 in a burst at the end of each burst B1-B5, the additional data packets are interleaved with the data packets in each burst B1-B5, so that both the start and end times of bursts in cells C1, C2 are synchronised. Therefore, where a terminal 10b moves from cell C2 to cell C1, the calculation of the expected burst start time by the controller 17 may continue with little or no disruption, as the burst interval $t_i$ and, in this particular example, the burst start times and burst lengths, are unchanged.

Figure 8:
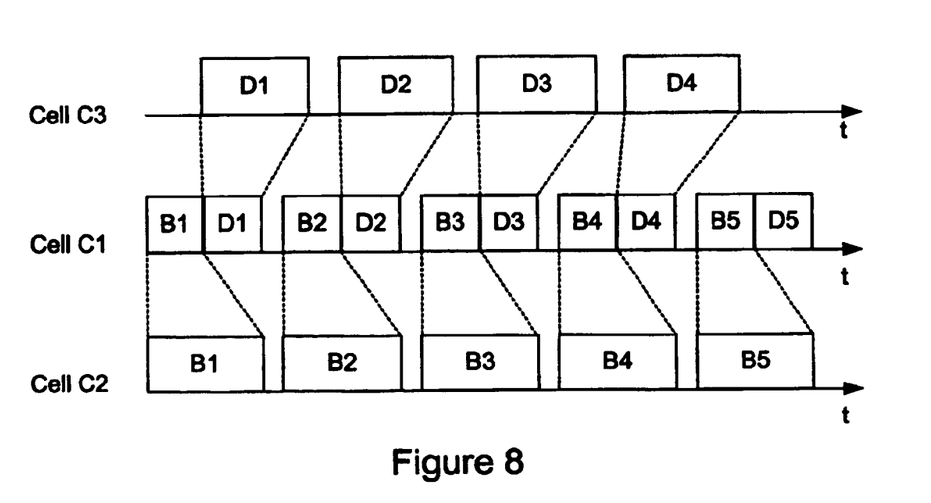
FIG. 8 shows the transmission of a series of bursts in three communication cells following adjustment of the burst transmission rate according to a fourth embodiment of the invention.

FIG. 8 shows a fourth embodiment of the invention in which data bursts D1-D5 broadcast in a second neighbouring cell C3 form the additional data used to adjust the burst transmission rate in cell C1. In this example, cell C3 transmits bursts D1-D5 at a burst transmission rate br(3) lower than br(1) and the data D1-D5 has a payload equal to P2, so that transmissions of bursts B1-B5 and D1-D5 are synchronised between cells C1 and C2 and between C1 and C3 respectively. As in the previous embodiment, a terminal 10a, 10b located in the area covered by cell C1 can be controlled so as to receive bursts B1-B5 only, D1-D5 only, or both sets of data according to its user's requirements.

Figure 9:
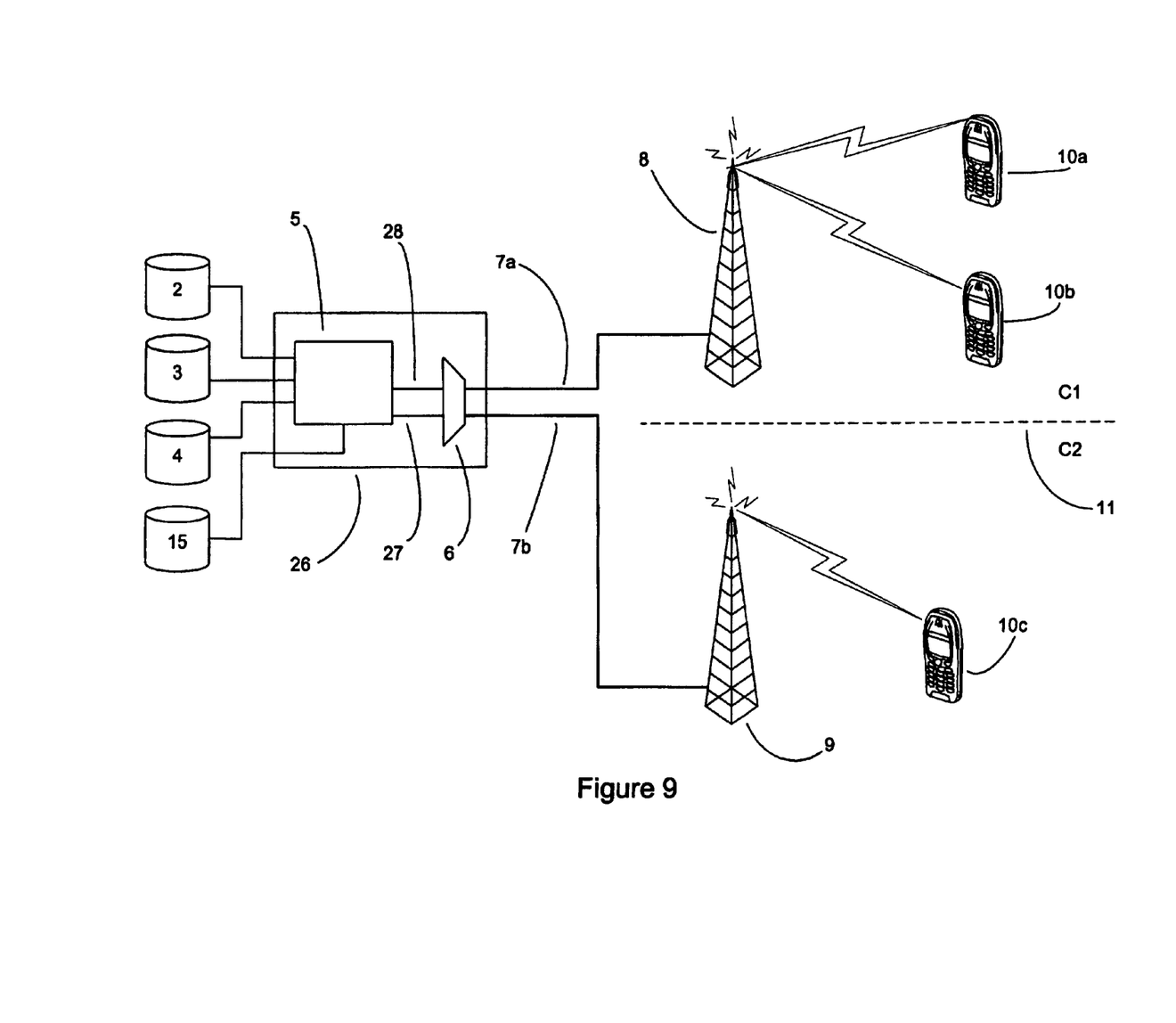
FIG. 9 shows a communication system according to a fifth embodiment of the invention.

FIG. 9 depicts an alternative communication system according to a fifth embodiment of the present invention. In this embodiment, an "intelligent" broadband digital broadcast head-end 26 is provided in place of the head-end 1 of the first embodiment. Information relating to the bit rates and/or burst transmission rates of transmitters 8, 9 are stored in the data processor 5. The incorporation of additional data is carried out by the data processor 5 and multiplexer 6 to produce multiple transport streams 7a, 7b that are customised according to the respective burst transmission rates in cells C1 and C2.

Figure 10:
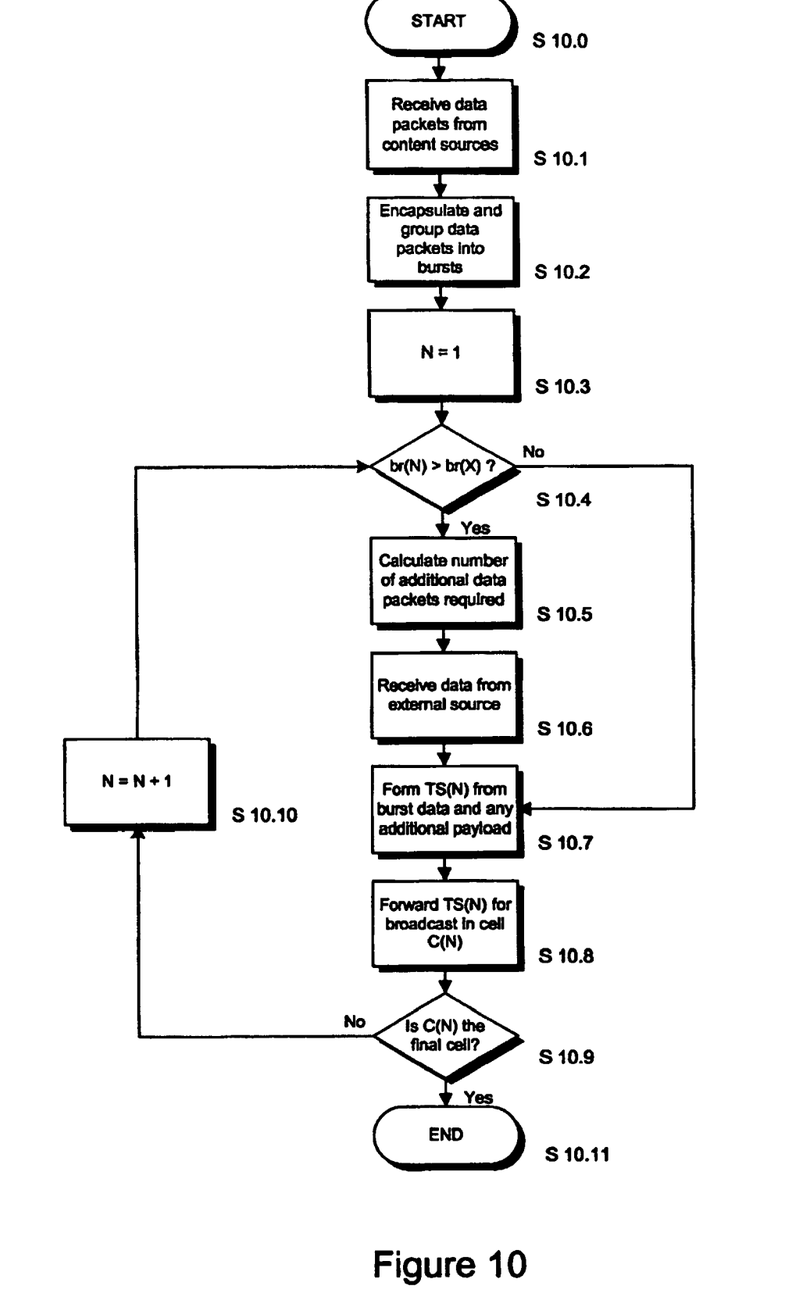
FIG. 10 is a flowchart of the burst transmission rate adjustment process according to the fifth embodiment of the invention.

The burst transmission rate adjustment process according to the fifth embodiment of the invention is shown in FIG. 10. In this example, the adjustment of burst transmission rates is performed on the basis of the bit rates associated with the transmitters 8, 9, although the burst transmission rates for the cells C1, C2 can be used instead, should these differ from the bit rates as discussed above.

Starting at step s10.0, the data processor 5 receives data packets from the content sources 2, 3, 4, (step s10.1) which it encapsulates and groups into one or more bursts as in the first embodiment (step s10.2), where each burst has a bandwidth equal to or approaching the maximum bandwidth available to the communication system.

Separate transport streams 7a, 7b are then formed for each transmitter 8, 9 as follows. Beginning with a first cell C1 in which the service associated with the burst series is to be provided (step s10.3), the data processor 5 compares the bit rate associated with the cell C1, br(1), with a reference bit rate br(X) (step s10.4). The reference bit rate br(X) is preferably equal to, or less than, the lowest bit rate of all the transmitters 8, 9 in the communication system. In this example, br(X) is equal to br(2).

As br(1) is greater than br(2), the data processor 5 adjusts the burst transmission rate in cell C1 by incorporating additional data in the transport stream 7a sent to transmitter 8. The data processor 5 calculates the number P2 of additional data packets required from the bit rates br(1), br(X) as described above (step s10.5). Additional payload data 27 is retrieved, for example from external source 15 (step s10.6), and forwarded to the multiplexer 6, along with burst series data 28. As in the previous embodiments, the additional payload data 27 may be e.g. an advertisement, local data associated with another cell, other data, padding or a combination of some or all of these. The multiplexer 6 combines the two sets of data 27, 28 according to a TDMA scheme (step s10.7), for example by appending additional payload data to each burst or interleaving additional payload data 27 within each burst, as described above, and forwards them in an MPEG-2 transport stream 7a for broadcast by the transmitter 8 (step s10.8).

The data processor 5 then considers the next cell C2 in which the service is to be provided (steps s10.9, s10.10). In this example, the data processor 5 determines that br(2) is equal to br(X) (step s10.4) and so the multiplexer 6 forms a transport stream 7b from the burst series data 28 without including any additional payload data 27 (step s10.7), which is forwarded to the transmitter 9 (step s10.9).

The process continues until a transport stream 7a, 7b has been forwarded to each cell C1, C2 in which the service is provided. The burst transmission rate adjustment process is then complete (step s10.11).

Many modifications and variations to the embodiments described above are possible. For example, the invention is not limited to IP services and may be applied to other types of services in a variety of communications systems, including pure DVB Transport Stream delivery. In addition, the invention is not limited to the transmission of bursts in a transport stream and may be used for other data streams, such as a Multi-Protocol Encapsulation (MPE) section stream.

As noted above, it is not always appropriate for the determination of the payload amount to be based on the bit rates associated with the transmitters 8, 9 in cells C1, C2. In a communication system where the transmission capacity of a cell C1 is shared, the determination of the payload amount is based on the rate at which data in the series of bursts B1-B5 is transmitted in the cells C1, C2.

Furthermore, while FIG. 2 shows an arrangement where only one transmitter 8 is associated with a means 12 for adjusting a burst transmission rate and data source 15, further transmitters 9 may be associated with further data processors and data sources in order to adjust burst transmission rates in their corresponding cells. In addition, a communication system may include both the "intelligent" head-end 26 and one or more means 12 for adjusting a burst transmission rate and data sources 15.

The above examples describe burst transmission rate adjustment processes in which an amount of additional data equal to the payload amount P2 is added to each burst in a series. However, the invention may be implemented so that each burst B1-B5 includes an amount of additional data that is less than the payload amount P2 in combination with a dwell period in order to maintain synchronisation of the bursts B1-B5 in cells C1, C2.

Instead of being switched between on and off states, selective data reception may be implemented by switching the receiver between high and low power operating modes. The invention is not limited to systems where the receiver 19 forms part of a mobile telecommunication device 10a. The receiver may be any receiving device with DVB, ISDB, ATSC or similar baseband capability, such as a suitably equipped laptop computer. Depending on the type of network used, the receiver may take any suitable form, such as a personal digital assistant (PDA) or a portable sound reproduction device, such as a personal stereo. Alternatively, the receiver could be a wireless local area network (WLAN) module.

The invention claimed is:

1. A method, comprising:
   receiving data from a source;
   producing a first data stream comprising said data in the form of a series of bursts for broadcast in a first cell of a cellular communication system;
   producing a second data stream comprising the series of bursts for broadcast in a second cell of the cellular communication system, including determining an additional data limit on the basis of first and second data transmission rates associated with the first and second cells respectively such that, when an amount of additional data equal to said additional data limit is added to each burst in the series prior to broadcast, the start times of corresponding bursts broadcast in the first and second cells are synchronized;
   and, if the additional data limit is greater than zero,
   receiving additional data from an additional data source and
   incorporating an amount of additional data less than or equal to said additional data limit to each burst in the second data stream;
   broadcasting the first data stream in the first cell; and
   broadcasting the second data stream in the second cell.

2. A method according to claim 1, wherein said amount of additional data is interleaved with said data in each burst.

3. A method according to claim 1, wherein an additional burst comprising said amount of additional data is appended to each burst.

4. A method according to claim 3, wherein start times of additional bursts broadcast in the second cell are synchronized with start times of bursts of said additional data broadcast in a third cell.

5. A method, comprising:
   receiving a series of data bursts from a source;
   outputting a first data stream comprising the series of data bursts, including determining an additional data limit on the basis of first and second data transmission rates associated with first and second cells of a cellular communication system respectively such that, when an amount of additional data equal to said additional data limit is added to each burst in the series in the first data stream prior to broadcast, the start times of bursts broadcast in the first cell are synchronized with the start times of corresponding bursts in the second data stream when broadcast in the second cell
   and, if the additional data limit is greater than zero,
   receiving additional data from an additional data source and
   multiplexing an amount of additional data less than or equal to said additional data limit with each data burst in the first data stream, said amount being less than or equal to said additional data limit; and
   broadcasting the first data stream in the first cell.

6. A method according to claim 5, wherein said amount is equal to the additional data limit.

7. A method according to claim 5, wherein said amount of additional data is interleaved with said data in each data burst.

8. A method according to claim 5, wherein said amount of additional data is appended to each data burst.

9. A method according to claim 5, wherein the start times are synchronized so that transmissions of corresponding bursts in the first and second cells begin simultaneously.

10. A method according to claim 5, wherein the start times are synchronized so that there is a fixed time period between the start time of a burst in the first cell and the start time of a corresponding burst in the second cell.

11. A method according to claim 5, wherein the additional data comprises local data associated with the first cell.

12. A method according to claim 5, wherein the additional data comprises padding.

13. A method according to claim 5, wherein the cellular communication system is a DVB network.

14. A method, comprising:
receiving data from a source,
producing a first data stream for broadcast in a first cell of a cellular communication system, the first data stream comprising said data in the form of a first series of bursts; and
determining an additional data limit based on data transmission rates associated with the first cell and a second cell of the cellular communication system such that, when an amount of additional data equal to said additional data limit is added to each burst in the series in a second data stream that includes the series of bursts, first time intervals between bursts in the first data stream when broadcast in the first cell are equal to second time intervals between corresponding bursts in the second data stream when broadcast in the second cell;
if said additional data limit is less than or equal to zero, producing a second data stream comprising the series of bursts;
if said additional data limit is greater than zero, producing a second data stream comprising a series of modified bursts, wherein each burst comprises said data and an amount of additional data that is less than or equal to the additional data limit.

15. An apparatus, comprising:
a receiver operable to receive data from a source;
a first data stream generator configured to produce a first data stream for transmission in a first cell of a cellular communication system, the first data stream comprising said data in the form of a series of bursts;
a second data stream generator configured to produce a second data stream for transmission in a second cell of the cellular communication system, wherein the second data stream comprises the series of bursts, and to determine an additional data limit on the basis of first and second data transmission rates associated with the first and second cells such that, when said an amount of additional data equal to said additional data limit is added to each burst in the series in the first data stream, start times of bursts in said data stream when broadcast in the first cell are synchronized with start times of corresponding bursts in a second data stream broadcast in the second cell and to, in the event that the additional data limit amount is greater than zero, receive additional data from an additional data source and add an amount of additional data less than or equal to said additional data limit to each burst in the second data stream so that, when the first and second data streams are broadcast in the first and second cells respectively, start times of bursts in the second data stream are synchronized with start times of corresponding bursts in the first data stream.

16. An apparatus, comprising:
a receiver operable to receive a data stream from a source, said data stream comprising a series of data bursts;
a burst rate adjuster configured to determine an additional data limit on the basis of first and second data transmission rates associated with first and second cells of a cellular communication system such that, when said an amount of additional data equal to said additional data limit is added to each burst in the series in the data stream, start times of bursts in said data stream when broadcast in the first cell are synchronized with start times of corresponding bursts in a second data stream broadcast in the second cell;
a multiplexer arranged to multiplex the series of data bursts with bursts of additional data to produce a modified data stream in the event that the additional data limit amount is greater than zero, wherein each burst of additional data comprises an amount of additional data that is less than or equal to said additional data limit.

17. An apparatus according to claim 16, configured so that said amount is equal to said additional data limit.

18. An apparatus according to claim 16, configured to synchronize the start times so that the transmissions of corresponding bursts in the first and second cells begin simultaneously.

19. An apparatus according to claim 16, configured to synchronize the start times so that there is a fixed time period between the start time of a burst in the first cell and the start time of a corresponding burst in the second cell.

20. An apparatus according to claim 16, configured to interleave additional data with said data in each burst in the series.

21. An apparatus according to claim 16, configured to append an additional burst comprising said amount of additional data to each burst in the series.

22. An apparatus according to claim 21, further configured so that start times of said additional bursts when broadcast in the second cell are synchronized with start times of corresponding bursts of additional data broadcast in a third cell.

23. A communication system comprising:
a receiving device;
a first network; and
an apparatus according to claim 16.

24. A communication system according to claim 23, wherein said first network is a DVB network.

25. A communication system according to claim 23, wherein the receiving device is configured to receive data from the first network and to enable telephone communications via a second network.

26. A communication system comprising:
a receiving device;
a first network; and
an apparatus according to claim 21;
wherein the receiving device is configured to selectively receive a modified series of bursts by suspending data reception during a time slot associated with the series of bursts so that the additional bursts are not received.

27. An apparatus according to claim 15, configured to interleave additional data with said data in each burst in the series.

28. An apparatus according to claim 15, configured to append an additional burst comprising said amount of additional data to each burst in the series.

29. An apparatus according to claim 28, further configured so that start times of said additional bursts when broadcast in the second cell are synchronized with start times of corresponding bursts of additional data broadcast in a third cell.

30. A communication system comprising:
a receiving device;
a first network; and
an apparatus according to claim 15.

31. A communication system according to claim 30, wherein said first network is DVB network.

32. A communication system according to claim 30, wherein the receiving device is configured to receive data from the first network and to enable telephone communications via a second network.

33. A communication system comprising:
   a receiving device;
   a first network; and
   an apparatus according to claim 28;
   wherein in the receiving device is configured to selectively receive a modified series of bursts by suspending data reception during a time slot associated with the series of bursts so that the additional bursts are not received.

* * * * *